United States Patent [19]

Jang

[11] Patent Number: 5,274,698
[45] Date of Patent: Dec. 28, 1993

[54] METHOD OF RESTRICTING TELEPHONE CALLS IN A PRIVATE BRANCH EXCHANGE SYSTEM

[75] Inventor: Tae-Soon Jang, Gumi, Rep. of Korea

[73] Assignee: SamSung Electronics Co., Ltd., Suwon, Rep. of Korea

[21] Appl. No.: 853,344

[22] Filed: Mar. 16, 1992

Related U.S. Application Data

[63] Continuation of Ser. No. 453,916, Dec. 20, 1989, abandoned.

[30] Foreign Application Priority Data

Feb. 28, 1989 [KR] Rep. of Korea ............... 2479-1989

[51] Int. Cl.$^5$ ............................................. H04M 1/66
[52] U.S. Cl. ........................................ 379/198; 379/200
[58] Field of Search ............ 379/196, 197, 198, 199, 379/200, 188, 368, 201

[56] References Cited

U.S. PATENT DOCUMENTS 4,096,356  6/1978  Burtness et al. ............... 379/198
4,602,132  7/1986  Nagatami et al. ............. 379/198 X
4,691,346  9/1987  Vanacore .......................... 379/198

*Primary Examiner*—James L. Dwyer
*Assistant Examiner*—Ahmad F. Matar
*Attorney, Agent, or Firm*—Robert E. Bushnell

[57] ABSTRACT

There is disclosed a method for restricting a telephone call in a key telephone or a private branch exchange (PBX). In the method, a user can restrict the telephone call by directly installing a telephone call restricting code when the user intends to restrict a toll call or international call according to the class of extension line. According to the method, a memory table for use in setting a code for allowing or denying a telephone call is designated and the user directly installs a telephone call restriction code on the vacant memory of the designated allowing/denying table and a telephone call is easily restricted according to the installed class designation data. Therefore, the improvement makes it possible to freely restrict an international telephone call as well as a toll call without changing the main program on the system even when the telephone call system of a telephone office switchboard is changed.

12 Claims, 5 Drawing Sheets

| 0 | 0* |
|---|---|
| 1 | 1* |
| 2 |  |
| . | . |
| . | . |
| . | . |
| 9 |  |

CLASS B DEYING TABLE

*FIG. 4A*

| 0 | 1800 |
|---|---|
| 2 | 1*800**E |
| . | . |
| . | . |
| . | . |

CLASS B ALLOWING TABLE

*FIG. 4B*

| 0 | 1* |
|---|---|
| 1 | 1935 |
| . | . |
| . | . |
| . | . |
| 9 |  |

CLASS C DENYING TABLE

*FIG. 4C*

| 0 | 1555 |
|---|---|
| 1 | 1///555**** |
| . | . |
| . | . |
| . | . |

CLASS C ALLOWING TABLE

*FIG. 4D*

| 0 | 1800*******E |
|---|---|
| . | . |
| . | . |
| . | . |
| 9 |  |

CLASS D ALLOWING TABLE

*FIG. 4D*

METHOD OF RESTRICTING TELEPHONE CALLS IN A PRIVATE BRANCH EXCHANGE SYSTEM

This is a continuation of application Ser. No. 07/453,916 filed on Dec. 20, 1989, now abandoned.

BACKGROUND OF THE INVENTION

The present invention relates to a method for restricting a telephone call in a key telephone or a private branch exchange (PBX) and, in particular, to a method by which a user can restrict the telephone call by directly installing a telephone call restricting code when the user intends to restrict a toll call or international call according to the class of extension line.

As to the restriction of a telephone call in general, class S makes all telephone calls available, class A makes only toll calls available, class B makes only local calls available and class C makes only extension calls available.

For the designation of extension class, the user can input a code or change the code by means of Man Machine Communication (MMC) which is performed by key programming. In the case of class A, however, it restricts only those numbers which begin with "0, 0". In the case of the class B, it restricts only those numbers which begin with '0'.

The reason that input and correction are made possible by the MMC is that the correction and designation of a corresponding telephone call restriction class are made possible when the telephone call restriction program data fit for classes A-C is previously stored on a memory of key telephone and the operator carefully inputs those MMC keys in regular order according to a complicated method. Thereafter, the speaker can speak over the telephone according to the allow class permitted by the MMC. It is arranged that the speaker is unable to speak according to the other levels.

Although the telephone call restriction method by means of MMC make it possible to designate a class by previously storing a telephone call restriction code by class on the memory and by the MMC's designation of a complicated key, it is not a thing anyone can do easily. Restrictions placed as stated above will do in the case of domestic service. However, in case a class is changed by the MMC in a foreign country, programming by means of said MMC is impossible and programmed data must be stored by being changed so as to be fit for a corresponding code or class.

SUMMARY OF THE INVENTION

Accordingly, an object of the present invention is to provide a method in which a memory table for use in setting a code for allowing/denying a telephone call is designated and the user directly installs a telephone call restriction code on the vacant memory of said designated allowing/denying table and a telephone call is easily restricted according to the installed class designation data.

Another object of the present invention is to provide a method which makes it possible to freely restrict an international telephone call as well as a toll call without changing the main program on the system even when the telephone call system of telephone office switchboard is changed.

According to an aspect of the invention, the inventive method designed to attain the above objects include the steps of:

(a) checking if # key data should be received in the hook-on condition and stored in the allowing/denying tables of the class B;

(b) checking if it is the data which should be stored in allowing/denying tables of the class C when it is not the value which should be input in the allowing/denying tables of class B;

(c) checking if it is the data which should be stored in the allowing table of class D when it is not the value which should be input to the allowing/denying tables of class C in step (b);

(d) selecting one table from among n-tables (preferably ten tables) and checking if it is the input of those numerals from 0 to 9 when it is the value which should be input to the corresponding class in steps (a)-(c);

(e) setting up the range of the number of keys to be input for 0 to 9 numerals and finishing the process by accepting the # key when it is the input of 0 to 9 numerals in step (d); and (f) allowing and denying all numeral keys on condition of "Don't Care" if * key is input when it is not the input of 0 to 9 numerals in the step (d) and processing it as an error when it is not the hold key and finishing the process by clearing the numerals and the * key which were input to the existing table when it is the hold key.

BRIEF DESCRIPTION OF THE DRAWINGS

For a better understanding of the invention and to show how the same may be carried into effect, reference will now be made, by way of example, to the accompanying drawings, in which:

FIGS. 4A through 4E illustrate the allowing and denying tables prepared according to the present invention.

DETAILED DESCRIPTION OF THE PREFERRED EMBODIMENTS

Now, a detailed explanation of the present invention will be given with reference to the drawings attached hereto.

Figure 1:
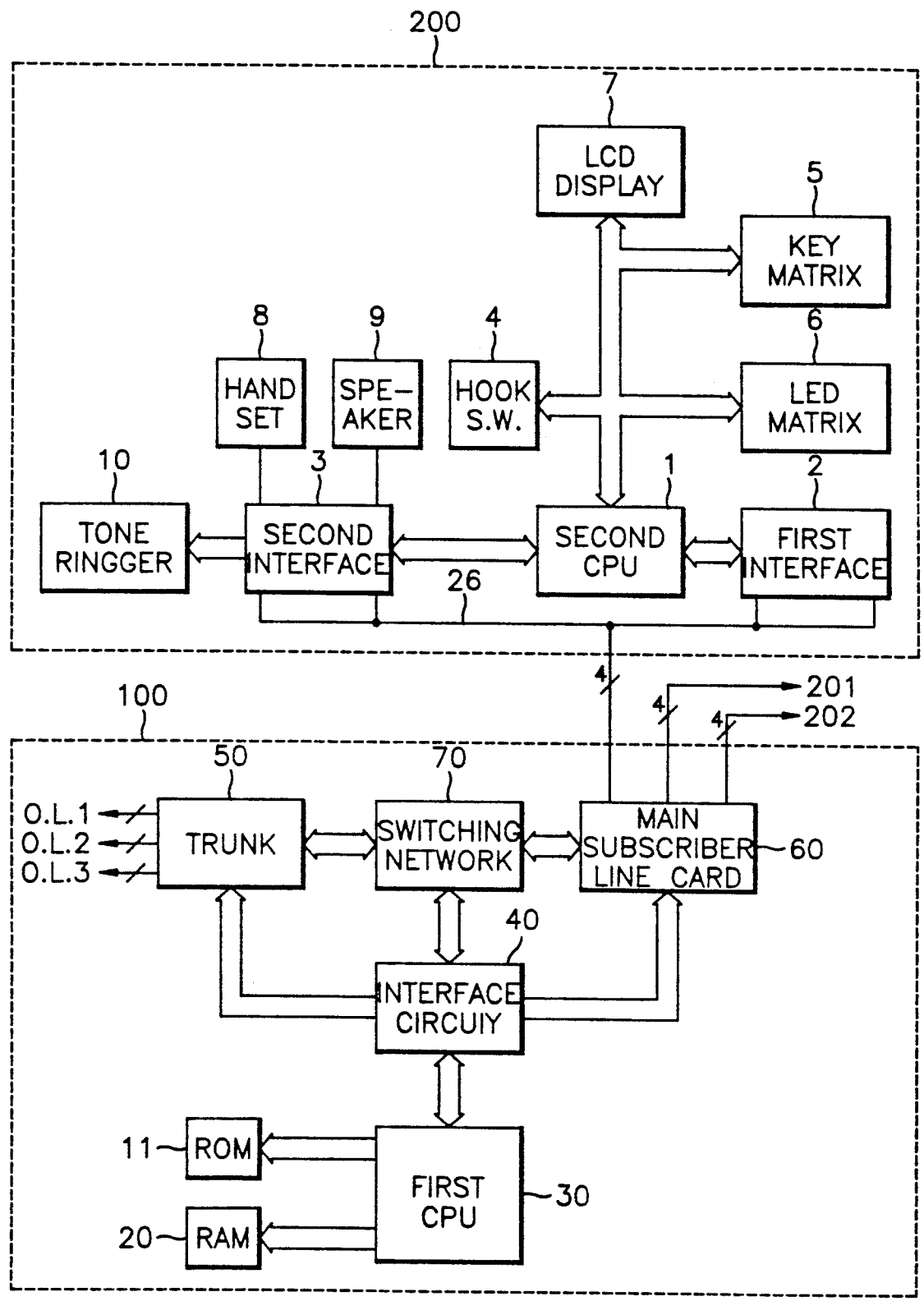
FIG. 1 is a systematic diagram for carrying out the present invention.

Referring to FIG. 1, there is shown a system block diagram for the present invention, in which the diagram is widely divided into main device and supplementary device.

The main device 100 of a key telephone system includes a ROM 11 with a built-in program for fulfilling its function of exchange and a built-in regular service data, a RAM 20 which is used as a range for each service class and system mode and for program and data processing and which stores the processed data temporarily, a first central processing unit 30 which accesses ROM 11 and RAM 20 and controls telephone call switching and provides various services, a main subscriber line card (MSLC) 60 which transmits signals and data through four or six lines by being connected to the key telephone sub-set provided with a button and a liquid crystal display (LCD) device, a trunk 50 which detects a ring and sends out a pulse by being connected to the office line and protects the system from overvoltage and makes compensation for the loss of a switching signal, and an interface circuit 40 which arranges a proper input/output of control data through said first central processing unit 30, the trunk 50, a switching network 70 and the main subscriber line card 60.

The supplementary device 200 of the key telephone system includes a second central processing unit 1 which processes a command word, controls a telephone call, displays a condition caused by sending out of a ring and processing of various functions, and processes control data for transmitting/receiving telephone calls according to a key input by the user, a first interface 2 which arranges an easy transmission of power and data to the main subscriber line card 60 of said main device 100, a second interface 3 which arranges an easy delivery of voice to the main subscriber line card 60 of said main device 100, a hook switch 4 which generates hook "on" and "off" information, a key matrix 5 which receives a command word from dial and key (not shown) by being connected to said second central processing unit 1, a light emitting diode (LED) matrix 6 which displays a condition caused by the key input which is input through key matrix 5, a handset 8 which transmits/receives the telephone call signal of the user by being connected to said second interface 3, a speaker phone 9 which arranges speaking over the telephone in the hook "on" condition of handset 8, a tone ringer 10 which is controlled by said second central processing unit 1 and generates a predetermined signal when a telephone call is received, and an LCD display 7 which is controlled by second central processing unit 1 and displays a dial number, the number of the other party when called on the extension telephone and a message such as a reservation, pre-engagement or denial of reception while the number connected with the office line is engaged.

The system formed as in FIG. 1 is connected to several supplementary devices 200, 201, 202 of the key telephone and they give control data to and receive it from one another and make it possible to speak over the telephone with the side of the office line by being interlocked therewith and, on the other hand, with supplementary devices 200, 201 which are key telephone sets, and with the main device 100, too.

Referring to general telephonic communication function performed by said main device 100 and supplementary device 200, the main device 100 detects a signal received from the office lines O.L. 1 through O.L. 8 and transmits it to each supplementary device.

Therefore, it not only permits the user to learn about the arrival of a message from the telephone office line but also transmits data for use in driving the LED to control several lamps of the LED matrix 6 to the supplementary device 200. Also, it accepts various data from the supplementary device 200 and can communicate not only with the telephone office line but also with the supplementary device 200. The supplementary device 200 gets various data from the main device 100 and turns on/off the lamps and then controls its condition. Also, it checks the pushed button and transmits input key data to the main device 100 and receives service from the main device 100.

Referring now to FIGS. 2A and 2B, they show an allowing/denying table preparation flow chart for the restriction of a telephone call according to the present invention.

The flowchart includes the steps of:

(a) checking if # key data should be received in the hook-on condition and stored in the allowing/denying tables of the class B;

(b) checking if it is the data which should be stored in the allowing/denying tables of the class C when it is not the value which should be input in the allowing/denying tables of the class B;

(c) checking if it is the data which should be stored in the allowing table of the class D when it is not the value which should be input to the allowing/denying tables of class C in the step (b);

(d) selecting one table from among n-tables (preferably ten tables) and checking if it is the input of those numerals from 0 to 9 when it is the value which should be input to the corresponding class in the steps (a)–(c);

(e) setting up the range of the number of keys to be input for 0 to 9 numerals and finishing the process by accepting the # key when it is the input of 0 to 9 numerals in the step (d); and (f) allowing and denying all numeral keys on condition of 'Don't Care' if * key is input when it is not the input of 0 to 9 numerals in the step (d) and processing it as an error when it is not the hold key and finishing the process by clearing the numerals and the * key which were input to the existing table when it is the hold key.

In the above process, class A is not restricted, class E is enabled to communicate with an extension line and class D enables only those numbers in the allowing table thereof to be spoken over the telephone. Class B and class C are correspondingly determined by the designation of allowing/denying tables.

Figure 3A:
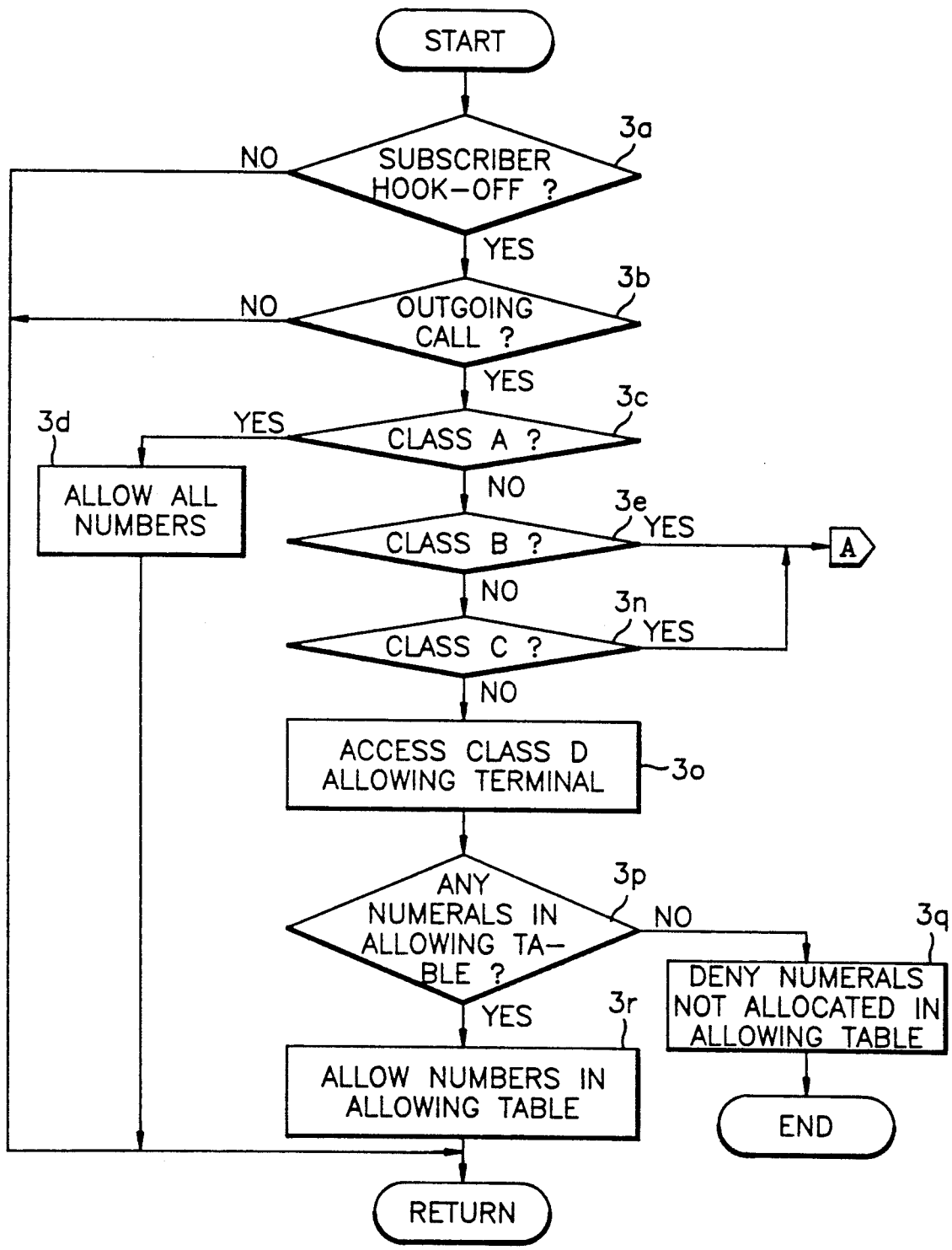
FIGS. 3A and 3B are a flow chart showing the telephone call restriction process according to the present invention.
Figure 3B:
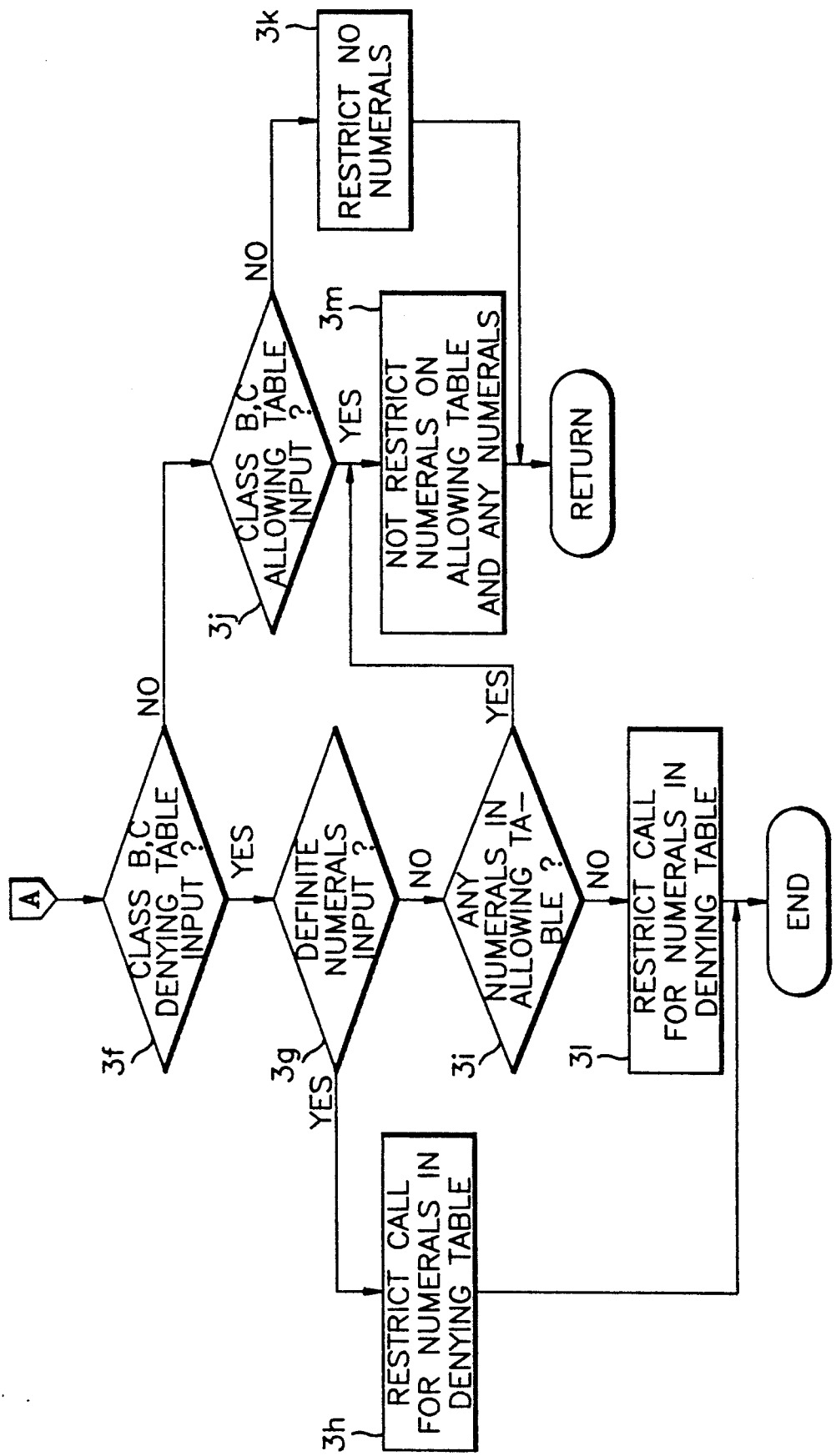

In FIGS. 3A and 3B, a flow chart showing the telephone call restriction process according to the present invention is specifically illustrated.

It comprises the steps of:

(a) checking whether a subscriber picks up the telephone and attempts to make an outgoing call;

(b) checking if the user is a subscriber who belongs to the classes A to C when the subscriber in step (a) makes an outgoing call;

(c) restricting no telephone number when the subscriber belongs to class A in step (b) and checking if the the telephone number dialed by the subscriber has been input in accordance with to the allowing/denying tables of class B and class C if the subscriber belongs to the class B and class C;

(d) checking if there is a definite number without an * input key when the telephone number of the subscriber is input to the denying tables of class B and class C in the step (c);

(e) restricting the definite number for class B when it is in the denying table in the step (d) and checking if it is in the allowing table when it is both in the denying table and allowing it for the class B and enabling any numeral key to be dialed if it is not in the allowing table;

(f) checking if the telephone number of dialed by the subscriber is in the allowing tables of class B and class C when it is not in the denying table thereof in the third process and restricting no telephone number in the allowing table and restricting no telephone number not in either the denying table or the allowing table.

(g) bringing the data in the allowing table of class D when the subscriber does not belong to classes A to C in step (b) and denying unconditionally if there is no corresponding number for restriction.

Making a detailed description of one embodiment of the present invention with reference to FIG. 1, FIG. 2 and FIG. 3, it comes as follows:

As in step 2a of FIG. 2A, when a program mode key (for example : # key) in the key matrix 5 is pushed, it is detected by the second CPU 1. Then, the second CPU 1 applies the detected key data to the main subscriber line card 60 through the first interface 2 and line 26. The main subscriber line card 60 applies the input key data to the first CPU 30 through the interface circuit 40 and the first CPU 30 judges that the program key data is input in step 2a and accesses program display message data from ROM 11 by the input program key data.

The accessed program display message data is output by the first CPU 30 to the second CPU 1 through the interface circuit 40, main subscriber line card 60, lines 201, 202 and first interface 2. The second CPU 1 which receives the program display message data outputs it to the LCD display 7 and makes it appear as "PROGRAM". The user who recognized (monitored) the message displayed on the LCD display 7 inputs a key code for allowance and denial through key matrix 5 according to the telephone call restriction class.

The second CPU 1 which received the key code checks if it has a the value (MMC : 33) which should be input to the denying table of class B in step 2b. If it does not have a value which should be input to the denying table of class B in step 2b, the second CPU 1 checks if it has a value (MMC : 34) which should be input to the allowing table of class B in step 2c and if it has a value (MMC : 35) which should be input to the denying table of class C in step 2d when it does not have a value which should be input to the allowing table of class B in step 2c.

Thereafter the second CPU 1 checks if it has a value (MMC : 36) which should be input to the allowing table of class C in step 2e when it does not have a value which should be input the denying table of the class C in step 2d and if it has a value (MMC : 37) which should be input to the allowing table of the class D in step 2o when it does not have a value which should be input to the allowing table of class C in the step 2e.

The second CPU 1 finishes processing when the value is not "37" in step 2o. When there is a value which should be input to the corresponding table by the steps 2b, 2c, 2d, 2e, 2o, the first CPU 30 checks if one table is selected from among ten tables in step 2f. In other words, the first CPU 30 judges that one allowing/denying table is selected from among the allowing/denying tables of each class and accesses the data in the ROM 11 and inputs it to the second CPU 1 in the supplementary device 200.

Accordingly, the second CPU 1 outputs a message to the LCD display 7 (for example : Deny in Class XX) according to the MMC code selected by the user and waits for input of the numerals zero through nine in step 2g. When one table is selected from among the ten tables, the letters "DBO" are displayed and the second CPU 1 checks denying or allowing numerals as in step 2g. It is also searched in the first CPU 30 whether a key is input or not. When the numerals zero through nine are input, it is searched in step 2h if maximum twelve numerals should be inputted. When twelve numerals are all input, it is checked in the step 2j. When a terminating key "#" is pushed after such a check, all the input numerals are saved in a given region of the RAM 20.

When the maximum twelve numerals are not input in the step 2h, it waits until twelve numerals are input. When twelve numerals are not input within a required time, it waits for the terminating key as in step 2i.

As the "Don't Care" is displayed when the * key, which is not a numeral key, is pushed in step 2g, it means that a certain numeral will be allowed or denied. If a hold key, which is not the * key, is input in step 2k, those numerals already input are cleared in step 2m. If the hold key is not input in the step 21, it is processed as an error and the key program is forced to come to an end.

Giving a detailed explanation of the examples designated by the allowing/denying tables according to the user's manipulation of the above processes, it is as follows:

Class A: It does not restrict the telephone numbers.
Class B: It restricts the telephone number if it is in the denying table thereof, but does not restrict it if it is in the allowing table thereof. However, when a definite number is input to the denying table thereof, it is restricted even when it is in the allowing table thereof.
Class C: It is same as B, but uses a different table.
Class D: It allows only those numbers in the allowing table thereof.
Class E: It makes only extension calls possible.

Figure 2:
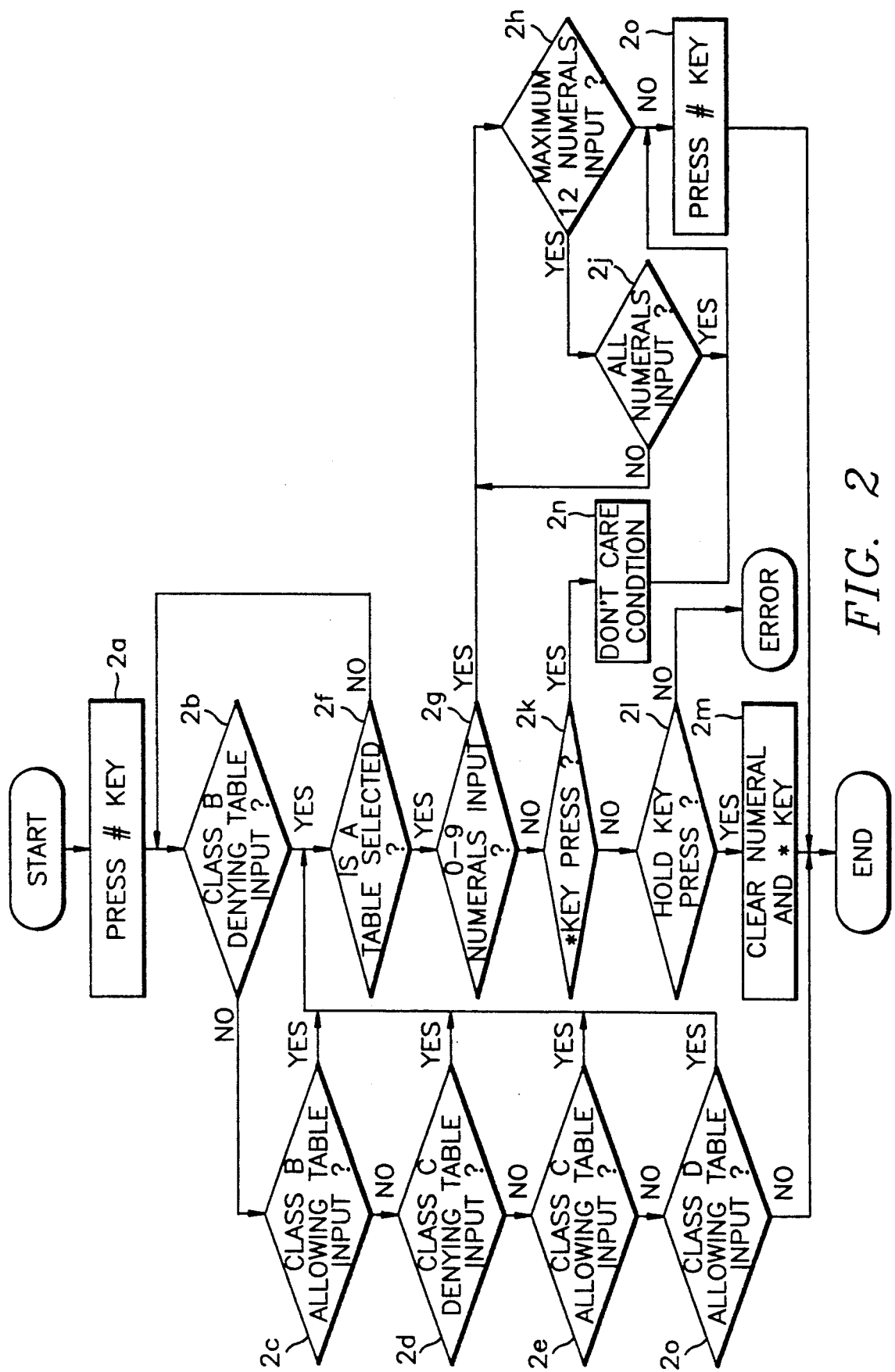
FIGS. 2A and 2B are a flow chart showing the memory table preparation for restricting (allowing and denying) a telephone call according to the present invention.

Although a concrete explanation is not given in FIG. 2, a class is designated by pushing the # key and numerals 3, 0 when a transmitter and a receiver are hooked on. Then, "STN TOLL CLASS" is displayed to the LCD display 7 and the present class is displayed. The user pushes a new class as many times as the number of extension lines.

Namely, 0 for Class A, 1 for Class B, 2 for Class C, 3 for Class D, 4 for Class E are pushed and initial values are set all to 0. When the # key is pushed lastly, an extension class is designated.

Giving an explanation of an example of input to the denying table of the class B in the step 2b, it is the input of a telephone number which the class B is unable to dial. The # key and program code 33 are pushed when a transmitter and a receiver are hooked on. Then, "DENY IN CLASS B" is displayed to the LCD display 7. And, to select the position of a table in the steps 2f, 2g, one of the 0 to 9 numerals is pushed.

The present condition is displayed like B, D, X:..... (where B represents the Class B; D, the Denial; X, the Position).

If a telephone number of a maximum twelve digits, which is to be checked in the step 2h for restriction, is pushed, it is determined according to 0 to 9. However, when it is the * key, it becomes 'Don't Care' (It means all digits from 0 to 9). If E(Hold Key) is pushed with the first digit, the input content is cleared. And when input the # key is pushed, input to the denying table of the class B is finished.

Giving an explanation of an example of the input to the allowing table of class B in the step 2c, it is the input of a telephone number which must be allowed, though the number is input to the denying table thereof. If the # key and then program code 34 are pushed when a transmitter and a receiver are hooked on, "ALLOW IN CLASS B" is displayed to the LCD display 7.

In order to select a table position which will be checked in step 2h, one of the numerals zero through nine is pushed. Then, B, A, X: ...... are displayed to the LCD display 7 (B represents the Class B; A, the Allowance; X, the Position). When an allowable telephone number of maximum twelve figures are pushed, it is determined according to numerals zero through nine. However when the * key is input, only those numerals input "Don't Care" condition (it means all numerals zero through nine) before E (Hold Key) : END digit (Hold Key) are allowed. When more numerals are pushed, they are restricted. In other words, the number of numerals of telephone number is restricted. When E is input with the first numerals, the input content is cleared. When the # key is pushed, input of the allowing table of the class B is finished.

As to input to the denying table of the class C, a program code 35 is input in the same way as the input to the denying table of the class B. As for the input to the allowing table of the class C, a program code 36 is input in the same manner as the input to the allowing table of the class B. Input to the allowing table of the class D is done by inputting a program code 37 in the same manner as the input to the allowing table of the class B.

The example processed in the steps 2b, 2c, 2d, 2e, 2o and memorized in the memory is stored as shown in FIGS. 4A through 4E. Thus, the class A allows all telephone numbers and the class B allows (as shown in FIG. 4A) all telephone numbers with the exception of those telephone numbers which start with 0, 1. However, class B allows (as shown in FIG. 4B) all telephone numbers which start with 1800, and the telephone numbers which start with 1, 0-9, 0-9, 0-9, 8, 0, 0 up to 11 numerals. The class C allows, as shown by FIG. 4C, all telephone numbers with the exception of those which start with 1. However, as is shown by FIG. 4D, it allows all telephone numbers which start with 1555, and the telephone numbers which start with 1555 up to 11 numerals but does not allow 1935. The class D allows, as is shown by FIG. 4E, only those telephone numbers of less than 11 figures which start with 1800. The class E allows only extension calls.

As described hereinabove, the user finishes key programming (MMC) and actually performs a call as shown in FIG. 3. Then, there comes the stage of searching allowing numerals and denying numerals. When a subscriber hangs off (i.e. picks up) the receiver to make a phone call in step 3a, it is transmitted to the main subscriber line card 60 through the first interface 2 by sensing a hook switch 4 in the second CPU 1. At this time, the first CPU 30 controls the switching network 70 through the main subscriber line card 60 at regular intervals and enables a dial tone to be heard. When a subscriber intends to make a phone call through the office line in step 3b, steps 3c, 3e, 3n and 3o must be checked for the first time. In step 3c, the data stored by designating a class by extension line in the key program in FIG. 2 is accessed in the range of the RAM 20 for comparison of classes.

If the class of the subscriber is A in the step 3c, it is the highest class and any telephone number can be dialed without restriction in step 3d. If the class is B in the step 3e, the corresponding denying table of the class B is accessed in the range of RAM 20 and, if any telephone number is input in step 3f by the subscriber, it is searched if there is an "*" code or a define number in step 3g, namely, if * code is input or only numerals are input. If there are definite numerals (for example, 1234), the numerals in the denying table of the class B are unconditionally denied in step 3h, even though the same numerals are in its allowing table.

If there are no definite numerals (for example, 12*4) in step 3g, it is compared, in step 3i for the first time with the numerals in the allowing table and the numerals in the denying table. In step 3i, if several numerals including "*" code are in the denying table and not in the allowing table the number is restricted in step 31, any numeral instead of "*" code can be dialed with several of the same numerals in the allowing table. If there are no numerals in the denying table nor in the allowing table in step 3i, any numeral can be dialed 3m. The step 3n is also used as described above.

In steps 3o, 3p and 3r only numerals saved in the allowing table can be dialed by the subscriber for extension of the class D and the numerals not saved in the allowing table are unconditionally denied as in step 3q.

Regarding the present invention, it is advantageous in that a toll call and an international call can be freely restricted in any district or country according to the system program of the user, effort and time can be curtailed as it is not necessary to correct the program even when the toll restriction system of a telephone office switchboard is changed and telephone calls can be easily restricted by simply installing the already-sold program of the entire system without making some changes in it.

While the invention has been particularly shown and described with reference to a preferred embodiment, it will be understood by those skilled in the art that modifications in detail may be made without departing from the spirit and scope of the invention.

What is claimed is:

1. A method of restricting telephone calls in a private branch exchange having a telephone key matrix for inputting key data, including programming steps and telephone call restricting steps, said programming steps comprising:

detecting if a program mode kay of said key matrix has been depressed thereby enabling response to key input data;

inputting a restriction code value as said key input data;

determining to which table, of a plurality of denying tables and a plurality of allowing tables, said restriction code value is to be input;

determining if one of said plurality of denying tables or said plurality of allowing tables has been selected to control said telephone call restricting steps in response to said restriction code value;

returning to said step of determining to which table said restriction code value is to be input if it has been determined that no table has been selected;

determining if one of numerals 0-9 is input from said key matrix if one of said plurality of denying tables or said plurality of allowing tables has been selected;

determining whether or not twelve numbers are required to be input from said key matrix if one of said numerals 0-9 has been determined to have been input or determining if a "don't care" key has been depressed if none of said numerals 0-9 has been determined to have been input;

determining if twelve numbers have been input from said key matrix if it has been determined that said twelve numbers are required to be input; and terminating said programming steps, after a desired sequence of numbers have been input from said key matrix when it has been determined that twelve numbers are not required for input or after it has been determined that twelve numbers have been input, to thereby enable said telephone call restricting steps.

2. The method as claimed in claim 1, wherein said numerals 0-9 correspond to locations in said plurality of tables for storing said sequence of numbers input from said key matrix, wherein said sequence of numbers correspond to telephone numbers which are restricted from being called or are allowed to be called.

3. The method as claimed in claim 2, further comprising the steps of:
inputting a sequence of numbers into one of said locations corresponding to said one of said numerals 0-9, wherein said sequence of numbers correspond to keys 0-9 a "*" key on said key matrix,
wherein said "*" key is depressed for placing a * in said sequence of numbers instead of a number, wherein said * corresponds to all of said numbers 0-9.

4. The method as claimed in claim 1, wherein said program key is a "#" key on the key matrix.

5. The method as claimed in claim 1, wherein said "don't care" key is the "*" key on said key matrix.

6. An apparatus for restricting of telephone calls in a private branch exchange having a telephone key matrix for inputting key data, said apparatus comprising:
a first processor for programming said apparatus by processing control data for transmission and reception of telephone calls according to key input data from said key matrix, and for controlling display of conditions of said apparatus;
a first interface for arranging transmission of data from said first processor to a main subscriber line card;
a light emitting diode array for displaying said conditions in response to said kay input data;
a liquid crystal display for displaying telephone numbers and messages;
a second processor for controlling telephone call switching, and for accessing a first memory for retrieval of message data;
a second memory for storing, temporarily, processed data in response to said second processor;
a second interface for communicating data between said main subscriber line car and said second processor;
wherein said first processor detects whether or not a program mode kay, included in said key matrix, has been depressed ,and provides program key data to said second processor through said first interface, said main subscriber line card and said second interface;
said second processor accesses program message display data in said first memory in response to said program key data, and provides said program message display data to said first processor for display on said liquid crystal display as an instruction to input a restriction code through use of said key matrix;
said first processor determines to which class table, of a plurality of denying class tables and a plurality of allowing class tables, said restriction code is to be input;
said second processor determines if one of said plurality of denying class tables or said plurality of allowing class tables has been selected to control restriction of telephone calls in response ti said restriction code, and accesses said first memory to retrieve mode selection data for input to said first processor;
said first processor determines a location, in a selected class table, where a sequence of numbers is to be stored in response to an input of one of numerals 0-9 input from said key matrix, wherein said sequence of numbers correspond to telephone numbers which are restricted from being called or are allowed to be called.

7. The apparatus as claimed in claim 6, wherein said first processor further determines whether or not twelve numbers are required to be input from said key matrix when one of said numerals 0-9 has been input and terminates said programming, after a desired sequence of numbers have bene input from said key matrix or after it has been determined that twelve numbers have been input.

8. The apparatus as claimed in claim 6, wherein said program key is a "#" key on the key matrix.

9. The method as claimed in claim 1, wherein said step of detecting if a program mode key has been depressed further comprises:
accessing program display data in a ROM for displaying, on a display, an instruction to input said restriction code.

10. The method as claimed in claim 9, wherein said step of determining if one of said plurality of denying tables or said plurality of allowing tables has been selected to control said restricting telephone calls further comprising the step of:
displaying on said display a message indicative of which one of said plurality of denying tables or said plurality of allowing tables has ben selected.

11. The method as claimed in claim 1, wherein said terminating step comprises the steps of:
depressing said program mode key a second time to end said programming steps.

12. The method as claimed in claim 1, wherein said telephone call restricting steps comprises the steps of:
checking whether a subscriber attempts to place an outgoing call;
making a determination of whether said subscriber belongs to one of a plurality of classes independence upon restriction code value input by said subscriber in comparison with selected ones of said plurality of denying tables and said plurality of allowing tables; and
allowing or denying said subscriber to place said outgoing call based upon said determination.

* * * * *

UNITED STATES PATENT AND TRADEMARK OFFICE
CERTIFICATE OF CORRECTION

PATENT NO. : 5,274,698
DATED : 28 December 1993
INVENTOR(S) : Tae-Soon Jang

It is certified that error appears in the above-indentified patent and that said Letters Patent is hereby corrected as shown below:

Column 1,

Line 36,     change "allow" to --allowing--;

Column 2,

Line 34,     change "FIGS. 2A and 2B are" to --FIG. 2 is--;

Line 37,     change "chart" to --charts--;

Column 3,

Line 64,     change "FIGS. 2A and 2B, they show" to --FIG. 2, it shows--;

Column 4,

Line 42,     delete "the";

Line 44,     delete "to";

Line 56,     delete "of";

UNITED STATES PATENT AND TRADEMARK OFFICE
CERTIFICATE OF CORRECTION

PATENT NO. : 5,274,698
DATED : 28 December 1993
INVENTOR(S) : Tae-Soon Jang

Page 2 of 4

It is certified that error appears in the above-indentified patent and that said Letters Patent is hereby corrected as shown below:

Column 5,

Line 1,     change "FIG. 2A" to --FIG.2--;

Line 22,     delete "the";

Line 36,     after "input", insert --to--;

Line 61,     change "inputted" to --input--;

Column 7,

Line 59,     after "if", insert --an--;

Column 8,

Line 1,     change "31" to --3l--;

IN THE CLAIMS

Column 8,

Line 32,     change "kay" to --key--;

UNITED STATES PATENT AND TRADEMARK OFFICE
CERTIFICATE OF CORRECTION

PATENT NO. : 5,274,698
DATED : 28 December 1993
INVENTOR(S) : Tae-Soon Jang

It is certified that error appears in the above-indentified patent and that said Letters Patent is hereby corrected as shown below:

Column 9,

Line 31,    change "kay" to --key--;

Line 44,    change "kay" to --key--;

Column 10,

Line 6,    change "ti" to --to--;

Line 22,    change "bene" to --been--;

Line 50,    change "independence" to --in dependence--; and

Line 51,    change "value" to --values--;

UNITED STATES PATENT AND TRADEMARK OFFICE
CERTIFICATE OF CORRECTION

PATENT NO. : 5,274,698
DATED : 28 December 1993
INVENTOR(S) : Tae-Soon Jang

It is certified that error appears in the above-indentified patent and that said Letters Patent is hereby corrected as shown below:

Drawing Sheet 5 of 5,      change "FIG. 4D" (second occurrence) to --FIG. 4E--.

*FIG. 4E*

CLASS D ALLOWING TABLE

Signed and Sealed this

Twenty-seventh Day of September, 1994

Attest:

BRUCE LEHMAN

*Attesting Officer*      *Commissioner of Patents and Trademarks*